(12) United States Patent
Jang et al.

(10) Patent No.: US 10,464,038 B2
(45) Date of Patent: Nov. 5, 2019

(54) MIXER AND REACTOR INCLUDING THE SAME

(71) Applicant: LG CHEM, LTD., Seoul (KR)

(72) Inventors: Jung Kee Jang, Daejeon (KR); Hyun Jin Shin, Daejeon (KR); Young Soo Song, Daejeon (KR)

(73) Assignee: LG Chem, Ltd., Seoul (KR)

( * ) Notice: Subject to any disclaimer, the term of this patent is extended or adjusted under 35 U.S.C. 154(b) by 158 days.

(21) Appl. No.: 15/296,788

(22) Filed: Oct. 18, 2016

(65) Prior Publication Data

US 2017/0120214 A1    May 4, 2017

(30) Foreign Application Priority Data

Oct. 29, 2015  (KR) .................. 10-2015-0151130

(51) Int. Cl.
*B01J 19/00* (2006.01)
*B01F 5/00* (2006.01)
*B01J 19/18* (2006.01)

(52) U.S. Cl.
CPC ......... *B01J 19/0066* (2013.01); *B01J 19/006* (2013.01); *B01J 19/18* (2013.01); *B01J 2219/00763* (2013.01)

(58) Field of Classification Search
CPC .... B01F 5/0057; B01F 3/0865; B01F 5/0065; B01F 5/0647; B01J 19/0066; B01J 19/006; B01J 19/18; B01J 19/2415; B01J 2219/00763; B01J 2219/00765
See application file for complete search history.

(56) References Cited

U.S. PATENT DOCUMENTS

| 4,164,960 | A | | 8/1979 | Howard | |
|---|---|---|---|---|---|
| 4,186,772 | A | * | 2/1980 | Handleman | A62C 31/12 137/891 |
| 2010/0006513 | A1 | * | 1/2010 | Fishler | B01F 1/0022 210/755 |
| 2011/0171082 | A1 | * | 7/2011 | Shiraishi | B01F 5/0057 422/198 |
| 2013/0112907 | A1 | * | 5/2013 | Doten | B01F 5/0415 252/2 |
| 2015/0157991 | A1 | | 6/2015 | Beg et al. | |

FOREIGN PATENT DOCUMENTS

JP          03-258332 A       11/1991

* cited by examiner

*Primary Examiner* — Anshu Bhatia
(74) *Attorney, Agent, or Firm* — Dentons US LLP

(57) ABSTRACT

A mixer and a reactor including the same are provided. According to one aspect of the present invention, the mixer includes a first piping part into which a first fluid flows, an elbow piping part having an inlet connected to the first piping part and an outlet provided at a location rotated by a predetermined angle from the inlet in a flow direction of the first fluid to have a curved flow path, and a second piping part connected to the elbow piping part to have a central axis perpendicular to a central axis of the first piping part so that a second fluid flows in a tangential direction of the elbow piping part when the second fluid flows into the elbow piping part.

15 Claims, 6 Drawing Sheets

[Fig. 1]
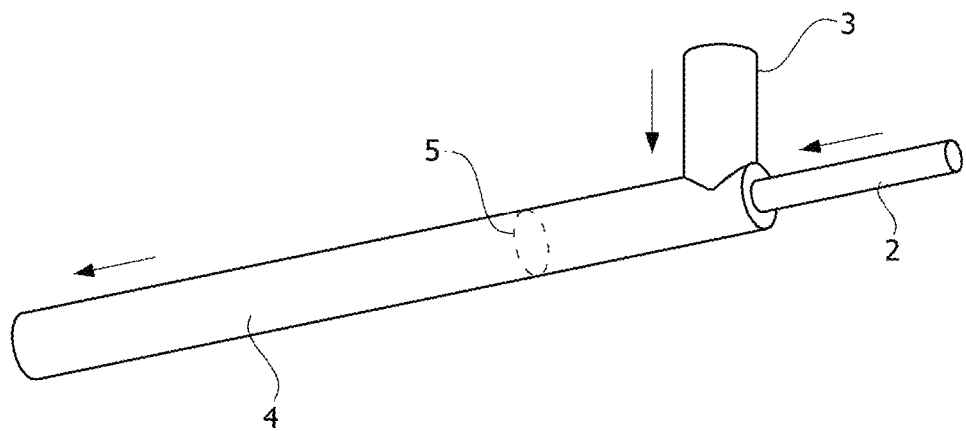
[Fig. 2]
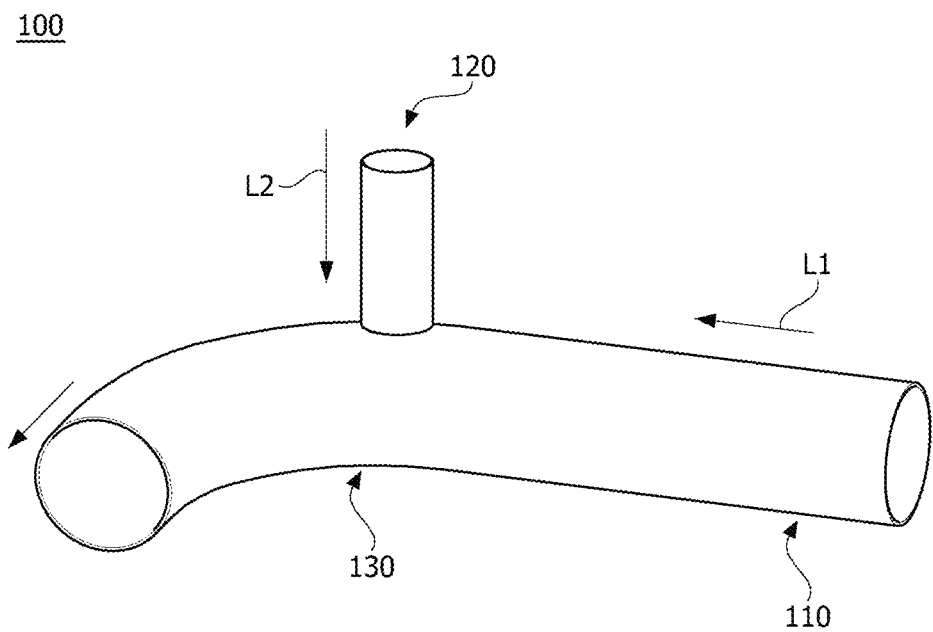

[Fig. 3]
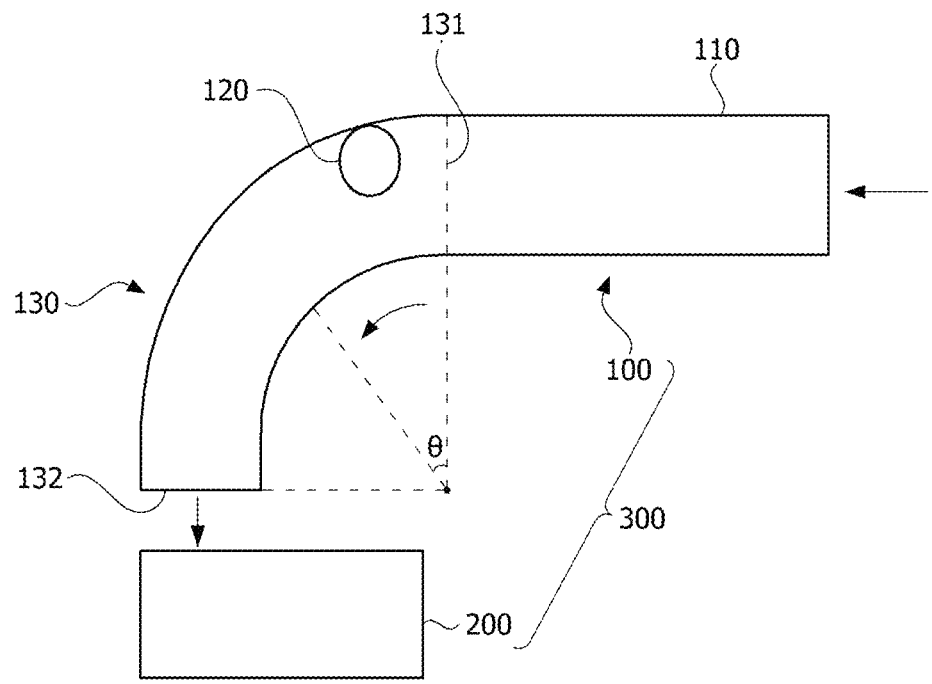
[Fig. 4A]
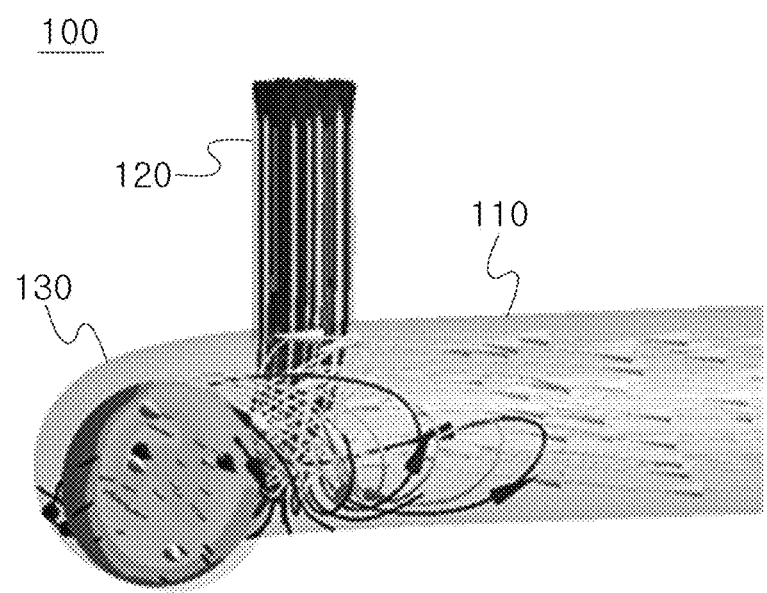

[Fig. 4B]
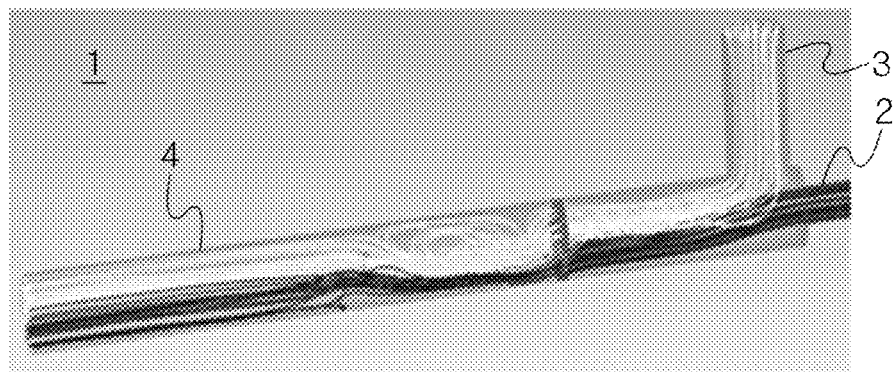
[Fig. 5A]
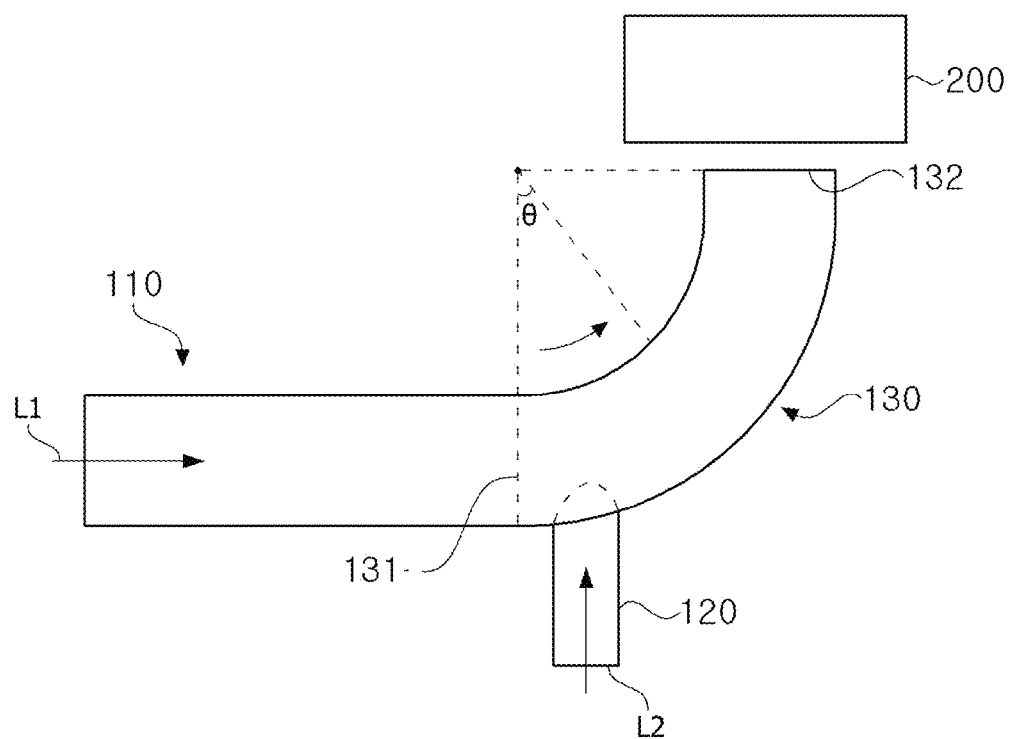

[Fig. 5B]
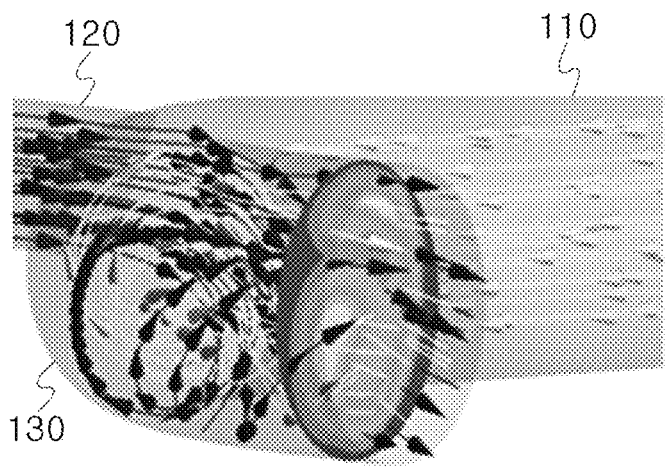
[Fig. 6A]
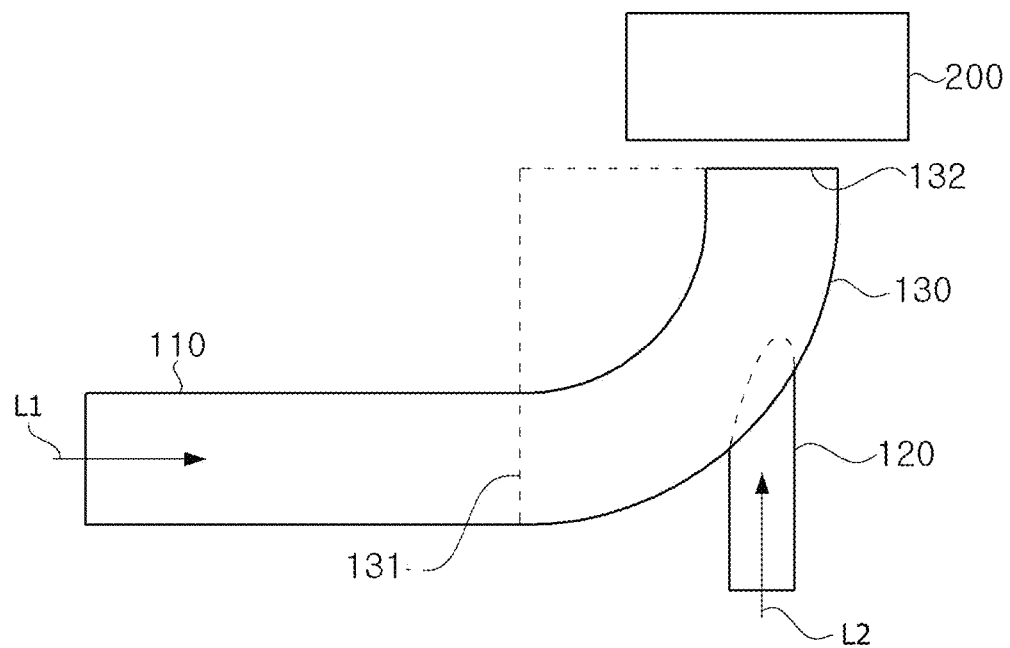

[Fig. 6B]
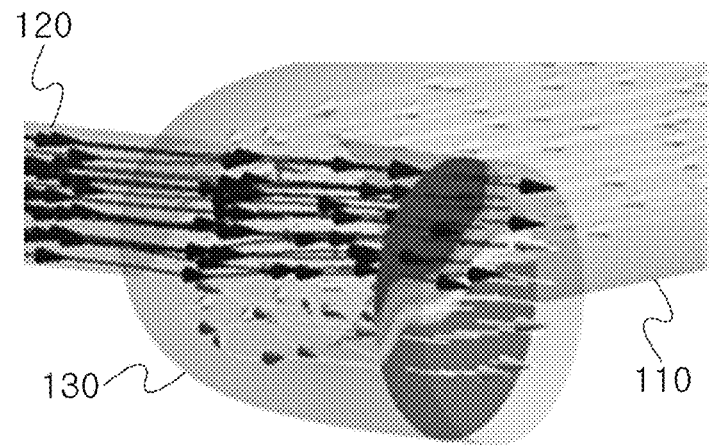
[Fig. 7A]
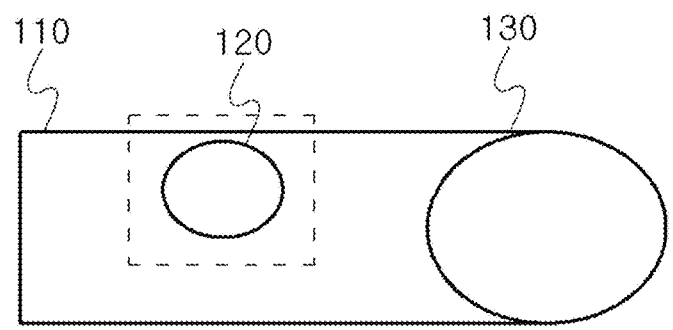
[Fig. 7B]
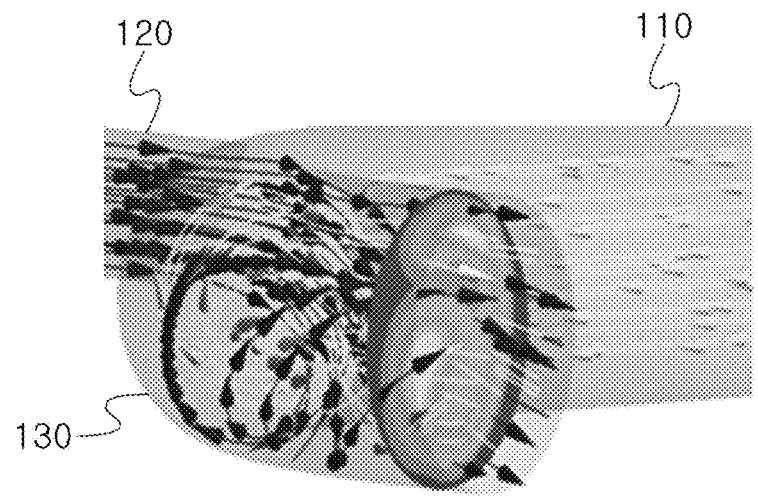

[Fig. 8A]
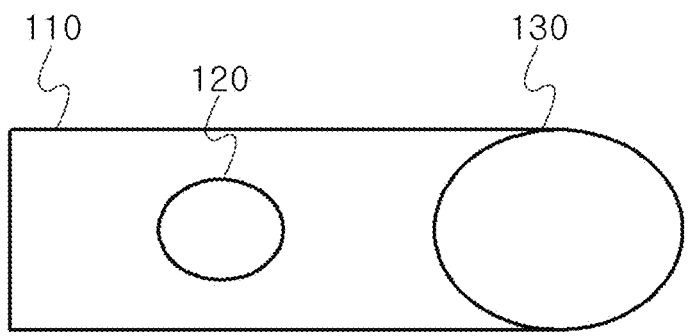
[Fig. 8B]
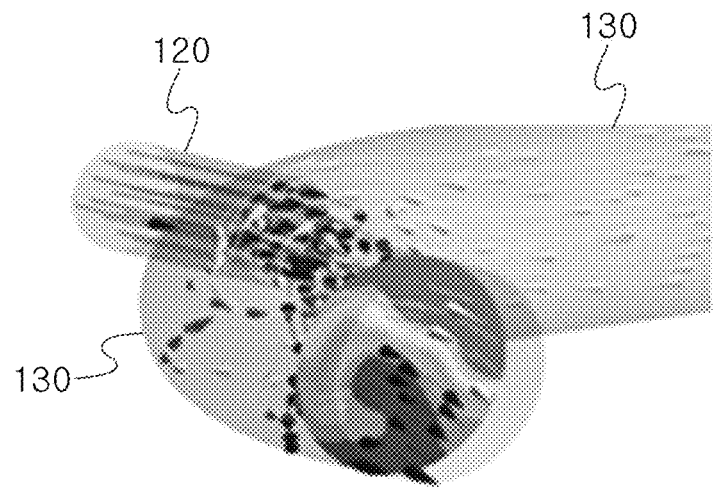

MIXER AND REACTOR INCLUDING THE SAME

CROSS-REFERENCE TO RELATED APPLICATION

This application claims priority to and the benefit of Korean Patent Application No. 10-2015-0151130, filed on Oct. 29, 2015, the disclosure of which is incorporated herein by reference in its entirety.

BACKGROUND

1. Field of the Invention

The present invention relates to a mixer and a reactor including the same.

2. Discussion of Related Art

FIG. 1 is a conceptual view illustrating a conventional mixer 1.

Referring to FIG. 1, in a case in which two kinds of immiscible fluids (for example, a first fluid and a second fluid) are continuously mixing and transferring to a certain location, a mixer 1 for mixing immiscible fluids includes a first pipe 2 into which the first fluid flows, a second pipe 3 into which the second fluid flows, and a third pipe 4 into which both the first fluid and the second fluid flow.

Here, the first fluid and the second fluid flowing in the third pipe 4 forms a separate layer and generate fouling in the third pipe 4. Accordingly, cleaning processes are frequently performed due to the fouling and unnecessary inoperational time is generated.

In addition, in order to induce mixing in the third pipe 4, a structure 5, such as a diffuser, should be installed. However, the problem in the above configuration is that fouling is generated on the structure 5 or additional cost is needed for installing the structure 5.

SUMMARY OF THE INVENTION

The present invention is directed to providing a mixer capable of increasing mixing efficacy and a reactor including the same.

In addition, the present invention is directed to providing a mixer capable of preventing fouling from being generated in a mixing process and a reactor including the same.

One aspect of the present invention provides a mixer including a first piping part into which a first fluid flows, an elbow piping part having an inlet connected to the first piping part and an outlet provided at a location rotated by a predetermined angle from the inlet in a flow direction of the first fluid to have a curved flow path; and a second piping part connected to the elbow piping part to have a central axis perpendicular to a central axis of the first piping part so that a second fluid flows in a tangential direction of the elbow piping part when the second fluid flows into the elbow piping part.

In addition, the second piping part may be connected to the elbow piping part to make the central axis thereof be perpendicular to a central axis of the outlet of the elbow piping part.

The second piping part may be connected to the elbow piping part to make the central axis thereof be parallel with a central axis of the outlet of the elbow piping part.

As the elbow piping part, a 90° elbow piping part provided for making a central axis of the inlet be perpendicular to a central axis of the outlet may be employed.

The second piping part may be connected to the inlet side of the elbow piping part for the first fluid.

The second piping part may be connected to the elbow piping part to make the central axis of the second piping part be located at a region between 0 and 40° of the elbow piping part in a direction in which the first fluid flows into the elbow piping part.

In addition, the mixer may further include a first supplying part connected to the first piping part for supplying the first fluid; and a second supplying part connected to the second piping part for supplying the second fluid.

The first fluid and the second fluid may be immiscible fluids having different densities, and the first fluid may include a polymer and the second fluid may include water.

The first piping part may have a diameter greater than that of the second piping part.

The elbow piping part may have a diameter which is equal to the diameter of the first piping part.

The first piping part and the elbow piping part may be formed integrally with each other.

In addition, the mixer may further include a third piping part connected to the elbow piping part to have a central axis perpendicular to the central axis of the first piping part so that both of the first fluid and the second fluid passed through the elbow piping part flow thereinto.

Another aspect of the present invention provides a mixer including a first piping part into which a first fluid flows, an elbow piping part connected to the first piping part, a second piping part connected to the elbow piping part to have a central axis perpendicular to a central axis of the first piping part so that a second fluid flows thereinto, and a third piping part connected to the elbow piping part to have a central axis perpendicular to the central axis of the first piping part so that both of the first fluid and the second fluid passed through the elbow piping part flow thereinto.

Still another aspect of the present invention provides a reactor including the mixer, and a chamber into which both of the first fluid and the second fluid passed through the mixer flow, the chamber being provided with an impeller.

In addition, the chamber may have one or more baffles provided therein.

As described above, the mixer according to at least one embodiment of the present invention and the reactor including the same have the advantage as below.

In order to mix two kinds of immiscible fluids, fluids flow into the elbow piping part, respectively, and, in particular, one fluid flows in the tangential direction of a flow section of the elbow piping part, the mixing efficacy can be enhanced. In addition, without using the structure such as the conventional diffuser, it is possible to enhance the mixing efficacy and to inhibit the fouling generation.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 is a conceptual view illustrating a conventional mixer;

FIG. 2 is a perspective view of a mixer according to a first embodiment of the present invention;

FIG. 3 is a plane view of the mixer shown in FIG. 2;

FIG. 4A is a view illustrating a result of a simulation using the mixer according to the present invention;

FIG. 4B is a view illustrating a result of a simulation using the conventional mixer in FIG. 1; and FIGS. 5A, 5B, 6A, 6B, 7A, 7B, 8A and 8B are views illustrating results of simulations based on various connection locations of the second piping part included in the mixer shown in FIG. 2.

DETAILED DESCRIPTION OF EXEMPLARY EMBODIMENTS

Hereinafter, a mixer and a reactor including the same according to an exemplary embodiment of the present invention will be described with the accompanying drawings in detail.

In addition, the structural element which is the same as or corresponds to the structural element which is already described is indicated by the same reference numeral, and a duplicated illustration thereof is omitted. For convenience of explanation, furthermore, dimension and shape of each structural element may be exaggerated or reduced.

FIG. 2 is a perspective view of a mixer according to a first embodiment of the present invention, and FIG. 3 is a plane view of the mixer shown in FIG. 2.

In the present disclosure, a reactor 300 includes a mixer 100 and a chamber 200. A stripper may be employed as the chamber 200. To this end, an impeller is provided in the chamber 200. The impeller is rotatably provided in the chamber 200. In addition, the impeller may include a rotational shaft and a plurality of blades provided on the rotational shaft. In response to rotation of the rotational shaft, the blades are rotated so that a stripping process may be conducted in the chamber 200. Furthermore, one or more baffles may be provided in the chamber 200.

The mixer may serve as a supplying line for supplying fluid into the chamber 200. In other words, two or more kinds of fluids are supplied into the chamber 200 via the mixer 100, and two or more kinds of fluids may be mixed in the process of being passed through the mixer 100.

In the present disclosure, a plurality of kinds of fluids may be referred to as first fluid L1 and second fluid L2. Both of the first fluid and the second fluid passed through the mixer 100 flow into the chamber 200. In addition, the first fluid L1 and the second fluid L2 may be immiscible fluids having different densities. For example, the first fluid L1 may be a polymer and the second fluid L2 may be water, and each simulation described below is conducted for the polymer and the water. In the present disclosure, in addition, the term "mixing" refers to mixing between the first fluid L1 and the second fluid L2, which is not caused by a chemical reaction in the process of passing through the mixer 100 and means that the first fluid L1 and the second fluid L2 are well dispersed. For example, the expression "the mixing efficacy is enhanced" indicates that a deviation from a well distributed state is small. Specifically, when the polymer and the water pass through the mixer 100, the mixing efficacy may be determined through a deviation of the polymer from a well distributed state at an outlet of the mixer 100. In other words, a smaller deviation of the polymer from a well distributed state indicates that mixing is well achieved.

Referring to FIGS. 2 and 3, the mixer 100 according to one embodiment of the present invention includes a first piping part 110 into which the first fluid L1 flows. The mixer 100 includes an elbow piping part 130 having an inlet 131 connected to the first piping part 110 and an outlet 132 provided at a location rotated by a predetermined angle from the inlet 131 in a flow direction of the first fluid L1 to have a curved flow path. In addition, the mixer 100 includes a second piping part 120 connected to the elbow piping part 130 to have a central axis perpendicular to a central axis of the first piping part 110, and the second fluid L2 flows into the second piping part 120.

Furthermore, the mixer 100 may include a first supplying part connected to the first piping part 110 for supplying the first fluid L1 and a second supplying part connected to the second piping part 120 for supplying the second fluid L2.

In addition, the first piping part 110 may have a straight flow path, and a central axis connecting centers of flow cross sections in a flow direction of the fluid is a straight line. Also, referring to FIG. 3, it is preferable that the elbow piping part 130 be a 90° elbow piping part in which a central axis of the inlet 131 is perpendicular to a central axis of the outlet 132.

Referring to FIGS. 2, 3, 4A and 4B, the second piping part 120 may be connected to the elbow piping part 130 to make the central axis of the second piping part be perpendicular to a central axis of the outlet 132 of the elbow piping part 130. Here, the term "the central axis of the outlet 132" means an imaginary line which passes through a center of the outlet 132 and is perpendicular to the outlet. Moreover, the second piping part 120 may have a straight flow path formed in a region adjacent to the elbow piping part 130 and a central axis connecting centers of flow cross sections in a flow direction of the fluid may be a straight line. In addition, the second piping part 120 may be connected to the elbow piping part 130 to make the central axis of the second piping part be parallel with the central axis of the outlet 132 of the elbow piping part 130 (see FIGS. 5A, 5B, 6A and 6B).

At this point, the second fluid L2 may flow into the elbow piping part 130 in a direction perpendicular to the flow direction of the first fluid L1. In the course of flowing into the elbow piping part 130 along the curved flow path, in particular, the first fluid L1 is mixed with the second fluid L2 flowing into the elbow piping part in a direction perpendicular to the flow direction of the first fluid L1.

Also, the first piping part 110 may have a diameter greater than that of the second piping part 120. In addition, a diameter of the elbow piping part 130 may be equal to that of the first piping part 110. Furthermore, the first piping part 110 may be formed integrally with the elbow piping part 130.

FIG. 4A illustrates a result of a simulation using the mixer 100 according to the present invention, and FIG. 4B illustrates a result of a simulation using the conventional mixer 1. FIG. 5 to FIG. 8 are views illustrating results of simulations based on various connection locations of the second piping part included in the mixer shown in FIG. 2.

Referring to FIGS. 3 and 4A, the second piping part 120 may be connected to the elbow piping part 130 so that the second fluid L2 flows in a tangential direction of the elbow piping part 130. Specifically, the second piping part 120 may be connected to the elbow piping part 130 so that the second fluid L2 flows in a tangential direction of a flow section (for example, a circular shape) of the elbow piping part 130.

Referring to FIGS. 4A and 4B, a deviation of the polymer distribution of 0.22 was measured at the outlet of the elbow piping part 130 of the mixer 100 according to the present invention, and a deviation of the polymer distribution of 1.02 was measured at the outlet of the conventional mixer 1. In other words, it could be confirmed that the mixing efficacy in the mixer 100 according to the present invention was enhanced.

Referring to FIG. 3, meanwhile, the second piping part 120 may be connected to the inlet 131 side of the elbow piping part 130 for the first fluid L1. Specifically, the second piping part 120 may be connected to the elbow piping part 130 such that the central axis of the second piping part is placed in a region between 0° to 40° (θ) of the elbow piping part 130 in a direction in which the first fluid L1 flows into the elbow piping part.

FIGS. 5A and 5B illustrate a drawing and a result of a simulation when the second piping part 120 is connected to a portion of the inlet 131 of the elbow piping part 130 for the first fluid L1, and FIGS. 6A and 6B illustrate a drawing and a result of a simulation when the second piping part 120 is connected to a central region of the elbow piping part 130.

In the mixer shown in FIGS. 5A and 5B, a deviation of the polymer distribution of 0.22 was measured at the outlet of the elbow piping part 130. Also, in the mixer shown in FIGS. 6A and 6B, a deviation of the polymer distribution of 0.43 was measured at the outlet of the elbow piping part 130. Referring FIGS. 5 and 6, it could be confirmed that, when the second piping part 120 is connected to the inlet 131 side of the elbow piping part 130 for the first fluid L1, the mixing efficacy of the mixer is enhanced.

FIGS. 7A and 7B illustrate a drawing and a result of a simulation when the second piping part 120 is connected to the elbow piping part 130 so that the second fluid L2 flows into the elbow piping part in a tangential direction of the elbow piping part, and FIGS. 8A and 8B illustrate a drawing and a result of a simulation when the second piping part 120 is connected to the elbow piping part 130 so that the second fluid L2 flows into the central region of the elbow piping part 130.

In the mixer shown in FIGS. 7A and 7B, a deviation of the polymer distribution of 0.25 was measured at the outlet of the elbow piping part 130. Also, in the mixer shown in FIGS. 8A and 8B, a deviation of the polymer distribution of 0.28 was measured at the outlet of the elbow piping part 130. Referring to FIGS. 7 and 8, it could be confirmed that, when the second piping part 120 is connected to the elbow piping part 130 so that the second fluid L2 flows in the tangential direction of the elbow piping part 130, the mixing efficacy of the mixer is enhanced.

Although the present invention is described with reference to the embodiment in the above detail description, those skilled in the art may understand that the present invention may be variously changed and modified without departing from the spirit and scope of the present invention and the modification, change, and addition can be encompassed within the appended claims.

For example, when the mixer 100 is employed as a supplying line of the reactor 300, the elbow piping part 130 of the mixer 100 may be directly connected to the chamber 200, and the elbow piping part 130 of the mixer 100 may be connected to the chamber 200 via a separate piping part.

In such a configuration, the mixer 100 may include the first piping part 110 into which the first fluid flows, the elbow piping part 130 connected to the first piping part 110, the second piping part 120 connected to the elbow piping part 130 to have a central axis perpendicular to a central axes of the first piping part 110, wherein the second fluid flows into the second piping part 120, and a third piping part (not shown) connected to the elbow piping part 130 to have the central axis perpendicular to the central axes of the first piping part 110, wherein both of the first fluid and the second fluid passed through the elbow piping part 130 flows into the third piping part. Here, both of the first fluid and the second fluid passed through the elbow piping part 130 flow into the third piping parts. Here, the third piping part may have a straight flow path formed in a region adjacent to the elbow piping part 130, and a central axis connecting centers of the flow cross sections in a flow direction of the fluid may be a straight line.

What is claimed is:

1. A mixing comprising:
   a first piping part into which a first fluid flows;
   an elbow piping part having an inlet connected to the first piping part and an outlet provided at a location rotated by a predetermined angle from the inlet in a flow direction of the first fluid to have a curved flow path; and
   a second piping part connected to the elbow piping part to have a central axis perpendicular to a central axis of the first piping part so that a second fluid flows in a tangential direction of a curved flow section of the elbow piping part when the second fluid flows into the elbow piping,
   wherein the first fluid flowing along the curved flow path is mixed with the second fluid in the elbow piping part wherein the second piping part is smaller in diameter than the diameter of the elbow piping part, and wherein the second piping part is closer to an outer portion of the elbow piping part than an inner portion of the elbow piping part.

2. The mixer of claim 1, wherein the second piping part is connected to the elbow piping part to make the central axis thereof be perpendicular to a central axis of the outlet of the elbow piping part.

3. The mixer of claim 1, wherein the second piping part is connected to the elbow piping part to make the central axis thereof be parallel with a central axis of the outlet of the elbow piping part.

4. The mixer of claim 1, wherein the elbow piping part is a 90° elbow piping part provided for making a central axis of the inlet be perpendicular to a central axis of the outlet.

5. The mixer of claim 4, wherein the second piping part is connected to the inlet side of the elbow piping part for the first fluid.

6. The mixer of claim 5, wherein the second piping part is connected to the elbow piping part to make the central axis of the second piping part be located at a region between 0 and 40° of the elbow piping part in a direction in which the first fluid flows into the elbow piping part.

7. The mixer of claim 1, further comprising;
   a first supplying part connected to the first piping part for supplying the first fluid; and
   a second supplying part connected to the second piping part for supplying the second fluid.

8. The mixer of claim 7, wherein the first fluid and the second fluid are immiscible fluids having different densities.

9. The mixer of claim 8, wherein the first fluid includes a polymer and the second fluid includes water.

10. The mixer of claim 1, wherein the first piping part has a diameter greater than that of the second piping part.

11. The mixer of claim 10, wherein the elbow piping part has a diameter which is equal to the diameter of the first piping part.

12. The mixer of claim 1, wherein the first piping part and the elbow piping part are formed integrally with each other.

13. The mixer of claim 1, further comprising a third piping part connected to the elbow piping part to have a central axis perpendicular to the central axis of the first piping part so that both of the first fluid and the second fluid passed through the elbow piping part flow thereinto.

14. A reactor comprising;
    the mixer according to claim 1; and a chamber into which the first fluid and the second fluid passed through the mixer flow, the chamber being provided with an impeller.

15. The reactor of claim 14, wherein the chamber is provided with one or more baffles.

\* \* \* \* \*